United States Patent
Minamitaka et al.

(10) Patent No.: US 11,488,491 B2
(45) Date of Patent: Nov. 1, 2022

(54) RECOMMEND APPARATUS, INFORMATION PROVIDING SYSTEM, METHOD, AND STORAGE MEDIUM

(71) Applicant: CASIO COMPUTER CO., LTD., Tokyo (JP)

(72) Inventors: Junichi Minamitaka, Kokubunji (JP); Hiroki Kanno, Higashiyamato (JP); Mitsuhiro Yonezawa, Ome (JP); Kenya Nozaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 232 days.

(21) Appl. No.: 17/016,452

(22) Filed: Sep. 10, 2020

(65) Prior Publication Data
US 2021/0090458 A1    Mar. 25, 2021

(30) Foreign Application Priority Data
Sep. 24, 2019  (JP) .............................. JP2019-172570

(51) Int. Cl.
*G09B 15/02*    (2006.01)
*G10H 1/00*    (2006.01)

(52) U.S. Cl.
CPC ......... *G09B 15/023* (2013.01); *G10H 1/0008* (2013.01); *G10H 2210/091* (2013.01)

(58) Field of Classification Search
CPC ............... G09B 15/023; G10H 1/0008; G10H 2210/091
See application file for complete search history.

(56) References Cited

U.S. PATENT DOCUMENTS

| | | | | |
|---|---|---|---|---|
| 6,545,209 B1 * | 4/2003 | Flannery | ................. | G06F 16/68 |
| | | | | 84/611 |
| 7,786,369 B2 * | 8/2010 | Eom | .................... | G10H 1/0008 |
| | | | | 84/618 |

(Continued)

FOREIGN PATENT DOCUMENTS

| JP | 2007256619 A | 10/2007 |
|---|---|---|
| JP | 2007264569 A | 10/2007 |

(Continued)

OTHER PUBLICATIONS

Japanese Office Action (and English language translation thereof) dated Apr. 26, 2022, issued in counterpart Japanese Application No. 2019-172570.

(Continued)

*Primary Examiner* — Robert W Horn
(74) *Attorney, Agent, or Firm* — Holtz, Holtz & Volek PC

(57) ABSTRACT

A recommend apparatus includes: a communication device; and at least one processor. The at least one processor is configured to: receive performance information generated based on a performance of a first user, through the communication device; determine a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play; determine recommendation information to be provided to the first user, based on performance information of the determined second user; and send the determined recommendation information from the communication device.

16 Claims, 15 Drawing Sheets

(56) References Cited

U.S. PATENT DOCUMENTS

| | | | | |
|---|---|---|---|---|
| 8,370,277 B2* | 2/2013 | Goto | ................... | G10H 1/0008 706/12 |
| 10,726,737 B2* | 7/2020 | Ariel | ................... | G09B 5/065 |
| 11,288,975 B2* | 3/2022 | Jancsy | ................ | G09B 15/023 |
| 2001/0056375 A1* | 12/2001 | Kunii | ................... | G09B 15/023 84/470 R |
| 2008/0134861 A1 | 6/2008 | Pearson | | |
| 2008/0302233 A1* | 12/2008 | Ding | ................... | G09B 15/023 84/609 |
| 2009/0228799 A1* | 9/2009 | Verbeeck | ............. | G10H 1/0008 704/235 |
| 2013/0074678 A1 | 3/2013 | Iwadate | | |
| 2013/0186258 A1 | 7/2013 | Tanaka | | |
| 2016/0104469 A1 | 4/2016 | Takahashi et al. | | |
| 2016/0231834 A1* | 8/2016 | Hardi | ................... | H04L 51/046 |
| 2016/0253915 A1* | 9/2016 | Lee | ..................... | G09B 15/023 84/609 |
| 2017/0330540 A1* | 11/2017 | Quattro | ................. | G06F 16/683 |
| 2021/0004402 A1* | 1/2021 | Li | ........................... | G06F 17/00 |
| 2021/0035541 A1* | 2/2021 | Pande | .................... | G10H 1/361 |
| 2021/0090458 A1* | 3/2021 | Minamitaka | ......... | G09B 15/023 |
| 2021/0358323 A1* | 11/2021 | Kajihara | ............... | G09B 15/023 |
| 2021/0358460 A1* | 11/2021 | Wirtz | ..................... | G09B 15/02 |
| 2021/0358462 A1* | 11/2021 | Kajihara | ................. | G10G 3/04 |
| 2022/0028295 A1* | 1/2022 | Toulson | .................. | G10L 25/18 |

FOREIGN PATENT DOCUMENTS

| | | |
|---|---|---|
| JP | 2013068878 A | 4/2013 |
| JP | 2013148773 A | 8/2013 |
| JP | 2015004973 A | 1/2015 |
| WO | 2008042655 A2 | 4/2008 |

OTHER PUBLICATIONS

Extended European Search Report (EESR) dated Dec. 3, 2020 issued in European Application No. 20195418.7.

* cited by examiner

FIG. 7A

SCORE LOG EXAMPLE

| USER ID | MUSIC ID | DATE | SCORE |
|---|---|---|---|
| U002 | S002 | 2018/12/1 | 50 |
| U002 | S002 | 2018/12/2 | 55 |
| U002 | S002 | 2018/12/3 | 56 |
| U001 | S001 | 2018/12/5 | 70 |
| U002 | S002 | 2018/12/5 | 60 |
| U002 | S002 | 2018/12/6 | 59 |
| U001 | S001 | 2018/12/7 | 80 |
| U002 | S006 | 2018/12/7 | 25 |
| U002 | S006 | 2018/12/8 | 30 |
| U001 | S001 | 2018/12/9 | 85 |
| ... | ... | ... | ... |

FIG. 7B

OPERATION LOG EXAMPLE

| USER ID | FUNCTION ID | DATE | VALUE |
|---|---|---|---|
| U001 | F004 | 201812081610 | 1 |
| U002 | F003 | 201812081720 | 127 |
| U002 | F001 | 201812081720 | 88 |
| U002 | F001 | 201812081720 | 88 |
| U002 | F005 | 201812081720 | 1 |
| U002 | F003 | 201812081720 | 127 |
| U001 | F003 | 201812091610 | 127 |
| U002 | F005 | 201812091720 | 1 |
| ... | ... | ... | ... |

FIG. 8

MUSIC DATABASE EXAMPLE

| MUSIC ID | DIFFICULTY LEVEL | GENRE | MUSIC TITLE |
|---|---|---|---|
| S001 | 20 | ETUDE | BEYER |
| S002 | 25 | ETUDE | BURGMULLER |
| S003 | 30 | ETUDE | CZERNY |
| S004 | 70 | POPS | THE HOUSE OF THE RISING SUN |
| S005 | 60 | POPS | MY WAY |
| S006 | 60 | PIANO MUSIC | SONATINA |
| ... | ... | ... | ... |

FIG. 9A

MUSIC USE TENDENCY DATA

| | U001 | U002 | U003 |
|---|---|---|---|
| DIFFICULTY LEVEL AVERAGE | 25.0 | 42.5 | 50.0 |
| NUMBER OF TIMES OF USE OF ETUDES | 6 | 14 | 4 |
| NUMBER OF TIMES OF USE OF POPS | 1 | 0 | 2 |
| NUMBER OF TIMES OF USE OF PIANO MUSIC | 0 | 2 | 0 |
| NUMBER OF TIMES OF USE OF SONGS | 2 | 0 | 0 |
| TOTAL NUMBER OF TIMES OF USE OF MUSIC | 9 | 16 | 6 |

INTER-USER MUSIC USE TENDENCY DISTANCE

| | SQUARES OF DIFFERENCES BETWEEN U001 AND U002 AND DISTANCE BETWEEN THEM | SQUARES OF DIFFERENCES BETWEEN U002 AND U003 AND DISTANCE BETWEEN THEM | SQUARES OF DIFFERENCES BETWEEN U001 AND U003 AND DISTANCE BETWEEN THEM |
|---|---|---|---|
| | 306.3 | 56.3 | 625.0 |
| | 64 | 100 | 4 |
| | 1 | 4 | 1 |
| | 4 | 4 | 0 |
| | 4 | 0 | 4 |
| DISTANCE | 19.5 | 12.8 | 25.2 |

FIG. 9B

| FUNCTION USE TENDENCY DATA | U001 | U002 | U003 | INTER-USER FUNCTION USE TENDENCY DISTANCE | | |
|---|---|---|---|---|---|---|
| | | | | SQUARES OF DIFFERENCES BETWEEN U001 AND U002 AND DISTANCE BETWEEN THEM | SQUARES OF DIFFERENCES BETWEEN U002 AND U003 AND DISTANCE BETWEEN THEM | SQUARES OF DIFFERENCES BETWEEN U001 AND U003 AND DISTANCE BETWEEN THEM |
| F001 NUMBER OF TIMES OF METRONOME USE | 2 | 3 | 1 | 1 | 4 | 1 |
| F002 NUMBER OF TIMES OF TEMPO CHANGE | 0 | 0 | 0 | 0 | 0 | 0 |
| F003 NUMBER OF TIMES OF USE OF DAMPER PEDAL | 1 | 5 | 1 | 16 | 16 | 0 |
| F004 NUMBER OF TIMES OF USE OF STEP LESSONS | 3 | 0 | 2 | 9 | 4 | 1 |
| F005 NUMBER OF TIMES OF USE OF A-B REPEATING | 0 | 6 | 0 | 36 | 36 | 0 |
| F006 NUMBER OF TIMES OF USE OF SOFT PEDAL | 0 | 0 | 0 | 0 | 0 | 0 |
| F007 NUMBER OF TIMES OF USE OF SOSTENUTO PEDAL | 0 | 0 | 0 | 0 | 0 | 0 |
| TOTAL NUMBER OF TIMES OF USE OF FUNCTIONS | 6 | 14 | 4 | 7.9 DISTANCE | 7.7 | 1.4 |

FIG. 11

| USER ID | MUSIC ID | DATE | SCORE | St | End | INITIAL SCORE | ATTAINMENT SCORE | TRAINING INTERVAL | SCORE CHANGE | CURRENT SCORE CHANGE | TRAINING PERIOD |
|---|---|---|---|---|---|---|---|---|---|---|---|
| U001 | S001 | 2018/12/5 | 70 | * |   | 70 | 70 | 0 | 0 | 0 | 0 |
| U001 | S001 | 2018/12/7 | 80 |   |   | 70 | 80 | 2 | 10 | 10 | 2 |
| U001 | S001 | 2018/12/9 | 85 |   |   | 70 | 85 | 2 | 15 | 5 | 4 |
| U001 | S001 | 2018/12/10 | 90 |   | * | 70 | 90 | 1 | 20 | 5 | 5 |
| U001 | S001 | 2018/12/12 | 92 |   | * | 70 | 92 | 2 | 22 | 2 | 7 |
| U001 | S001 | 2018/12/13 | 95 |   | * | 70 | 95 | 1 | 25 | 3 | 8 |
| U001 | S005 | 2018/12/14 | 20 | * |   | 20 | 20 | 0 | 0 | 0 | 0 |
| U001 | S009 | 2018/12/9 | 90 | * |   | 90 | 90 | 0 | 0 | 0 | 0 |
| U001 | S010 | 2018/12/10 | 87 | * |   | 87 | 87 | 0 | 0 | 0 | 0 |
| U002 | S002 | 2018/12/1 | 50 |   |   | 50 | 50 | 0 | 0 | -37 | 0 |
| U002 | S002 | 2018/12/2 | 55 |   |   | 50 | 55 | 1 | 5 | 5 | 1 |
| U002 | S002 | 2018/12/3 | 56 |   |   | 50 | 56 | 1 | 6 | 1 | 2 |
| U002 | S002 | 2018/12/5 | 60 |   |   | 50 | 60 | 2 | 10 | 4 | 4 |
| U002 | S002 | 2018/12/6 | 59 |   |   | 50 | 59 | 1 | 9 | -1 | 5 |
| U002 | S002 | 2018/12/9 | 61 |   |   | 50 | 61 | 3 | 11 | 2 | 8 |

| U002 | S002 | 2018/12/15 | 90 | | 50 | 90 | 1 | 40 | 2 | 14 |
| --- | --- | --- | --- | --- | --- | --- | --- | --- | --- | --- |
| U002 | S002 | 2018/12/16 | 95 | | 50 | 95 | 1 | 45 | 5 | 15 |
| U002 | S002 | 2018/12/18 | 96 | * | 50 | 96 | 2 | 46 | 1 | 17 |
| U002 | S006 | 2018/12/7 | 25 | * | 25 | 25 | 0 | 0 | 0 | 0 |
| U002 | S006 | 2018/12/8 | 30 | * | 25 | 30 | 1 | 5 | 5 | 1 |

FIG. 13

MUSIC MASTERING CHARACTERISTIC PARAMETER TABLE

|  | U001 (CAREFREE TYPE) | U002 (STOIC TYPE) | U003 (FRUSTRATED TYPE) |
|---|---|---|---|
| INITIAL SCORE | 67 | 38 | 7 |
| ATTAINMENT SCORE | 73 | 63 | 12 |
| TRAINING PERIOD (DAYS) | 2 | 9 | 4 |
| SCORE CHANGE (WHOLE PIECE OF MUSIC) | 18 | 22 | 14 |
| CURRENT SCORE CHANGE (ONE TIME) | 5 | 4 | 6 |
| SCORE CHANGE (AVERAGE) | 5 | 4 | 6 |
| TRAINING INTERVAL (AVERAGE) | 2 | 1 | 1 |

INTER-USER MUSIC MASTERING CHARACTERISTIC DISTANCE

| SQUARES OF DIFFERENCES BETWEEN U001 AND U002 AND DISTANCE BETWEEN THEM | SQUARES OF DIFFERENCES BETWEEN U002 AND U003 AND DISTANCE BETWEEN THEM | SQUARES OF DIFFERENCES BETWEEN U001 AND U003 AND DISTANCE BETWEEN THEM |
|---|---|---|
| 841 | 961 | 3600 |
| 100 | 2601 | 3721 |
| 49 | 25 | 4 |
| 16 | 64 | 16 |
| 1 | 4 | 1 |
| 1 | 4 | 1 |
| 1 | 0 | 1 |
| 31.8 | 60.5 | 85.7 |

DISTANCE

RECOMMEND APPARATUS, INFORMATION PROVIDING SYSTEM, METHOD, AND STORAGE MEDIUM

CROSS-REFERENCE TO RELATED APPLICATIONS

This application is based on and claims priority under 35 USC 119 from Japanese Patent Application No. 2019-172570 filed on Sep. 24, 2019, the contents of which are incorporated herein by reference.

TECHNICAL FIELD

The present disclosure relates to a recommend apparatus, an information providing system, a method, and a storage medium for providing information on music.

BACKGROUND ART

In a technical field for supporting people in learning how to play musical instruments by themselves, as a playing training device for giving optimal advice depending on user's playing skills and motivation, the following technique (for example, Japanese Patent Application Laid-Open No. 2013-148773) according to the related art is known.

This technique evaluates a motivation change based on the number of times of key depression, and generates advice.

However, since this technique generates information to be advice, based on performances and operations of only a user who is a subject, high-quality information is not always given to the user who is the subject.

SUMMARY

A recommend apparatus includes: a communication device; and at least one processor. The at least one processor is configured to: receive performance information generated based on a performance of a first user, through the communication device; determine a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play; determine recommendation information to be provided to the first user, based on performance information of the determined second user; and send the determined recommendation information from the communication device.

According to the present disclosure, high-quality information is given to a user who is a subject, whereby it becomes possible to satisfactorily support the user who is the subject in playing a musical instrument.

BRIEF DESCRIPTION OF DRAWINGS

FIG. 7A is a diagram depicting an example of a score log according to the second embodiment;

FIG. 7B is a diagram depicting an example of an operation log according to the second embodiment;

FIG. 8 is a diagram depicting a configuration example of a music database according to the second embodiment;

FIG. 9A is a diagram depicting examples of use tendencies and inter-user use tendency distances of music;

FIG. 9B is a diagram depicting examples of use tendencies and inter-user use tendency distances of function;

FIG. 11 is a diagram depicting examples of score log characteristics according to the second embodiment;

FIG. 13 is a diagram depicting examples of music master characteristic parameters and inter-user music mastering characteristic distances according to the second embodiment.

DESCRIPTION OF EMBODIMENTS

Hereinafter, embodiments of the present disclosure will be described in detail with reference to the drawings.

Figure 1:
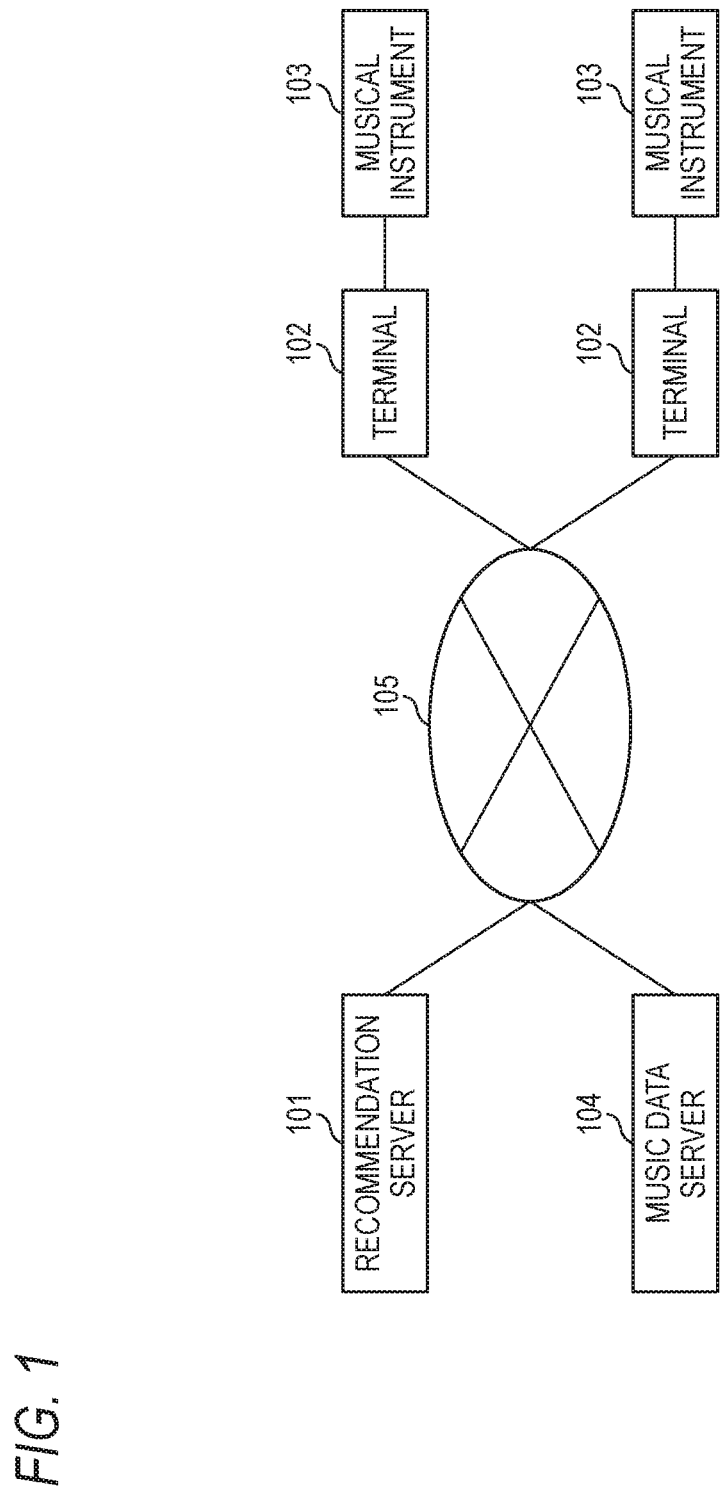
FIG. 1 is a system configuration diagram of an embodiment of an information providing system.

FIG. 1 is a system configuration diagram of an embodiment of an information providing system. A musical instrument 103 is connected to a terminal 102 which is, for example, a smart device such as a smart phone or a tablet, through a communication interface such as USB-MIDI (Universal Serial Bus-Musical Instrument Digital Interface). The terminal 102 is connected to a network 105 such as the Internet through a communication device built in the terminal. To the network 105, recommend apparatuses such as a recommendation server 101 and a music data server 104 are connected through a wide area network or a local area network, especially, a router device or the like (not shown in the drawing).

The musical instrument 103 is, for example, an electronic keyboard having an interface which is USB-MIDI and keys; however, it may be any other electronic musical instrument. If a user plays the musical instrument 103, performance-related information related to the performance is transmitted to the terminal 102 through USB-MIDI. The performance-related information is note on/off information representing which notes have been depressed or released by playing, for example, information representing which functions of various functions such as a "Metronome" function, a "Tempo switch" function, a "Damper Pedal" function, a "Step Lesson" function, a "A-B repeating" function, a "Soft Pedal" function, and a "Sostenuto" function have been operated.

The terminal 102 receives the performance-related information from the musical instrument 103, and transmits the performance-related information as log information to the recommendation server (a proposal information generating server apparatus) 101. Also, when the terminal 102 receives data on a piece of music to be played on the musical instrument by the user, from the music data server 104, in response to selection of a scoring function by the user, the terminal performs a process of scoring the user's performance on the musical instrument 103 and a process of displaying the scoring result, with respect to the performance-related information, and transmits scoring information on an interim result, a final result, and so on of the scoring, as log information, to the recommendation server 101. Thereafter, the terminal 102 receives information such as recommendation information (proposal information) and visualization information which is the result of analysis of the performance, from the recommendation server 101, and displays the received information.

If the recommendation server 101 receives the scoring information from the terminal 102, it generates information such as recommendation information and visualization information, and transmits the generated information to the terminal 102.

The music data server 104 transmits music data, such as note data and timing data on individual notes, related to the piece of music which the user plays on the musical instrument 103, to the terminal 102.

Figure 2:
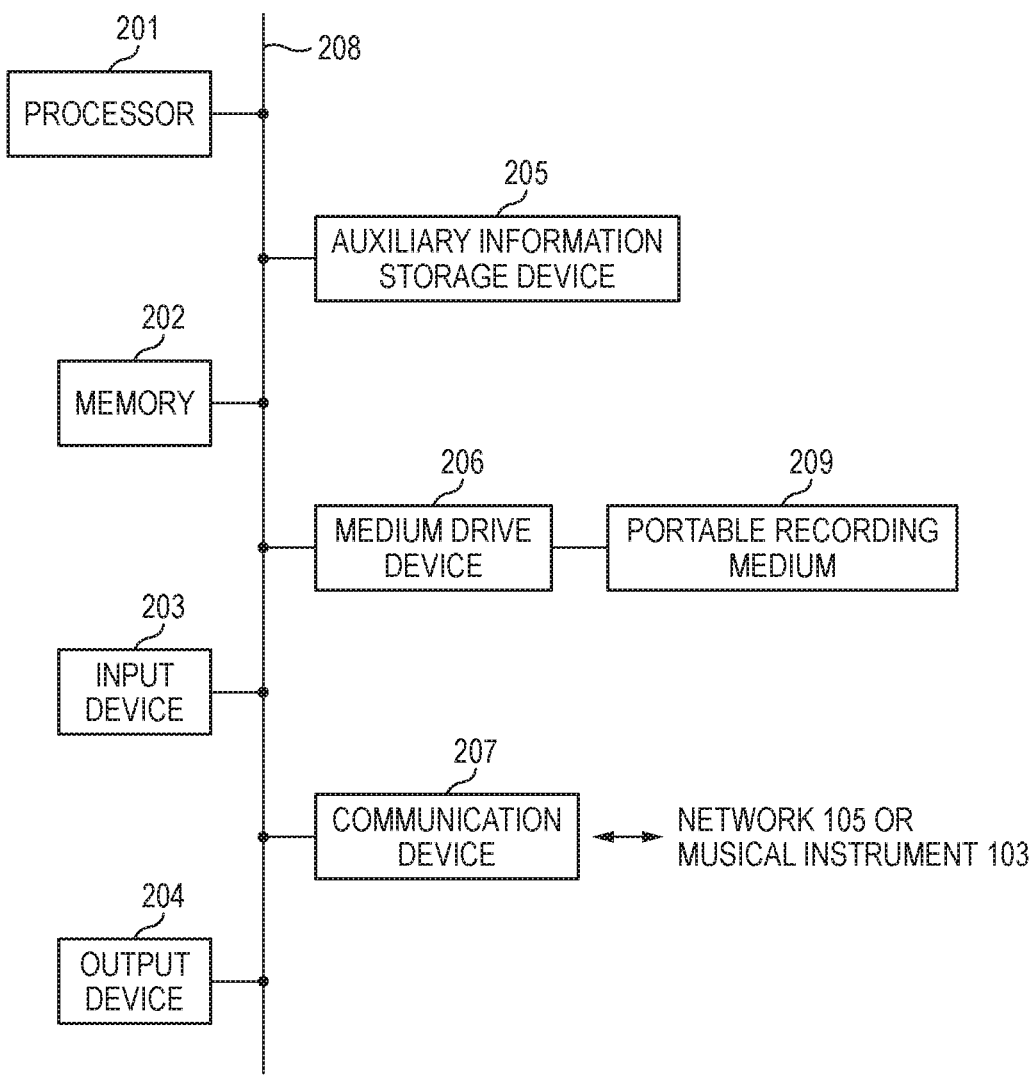
FIG. 2 is a diagram depicting a hardware configuration example of a server or a terminal.

FIG. 2 is a diagram depicting an example of the hardware configuration of a computer capable of realizing the recommendation server 101, the terminal 102, or the music data server 104 of FIG. 1. Examples of this computer include a smart phone, a tablet terminal, etc. besides a server computer. The computer shown in FIG. 2 includes a processor (for example, a CPU (Central Processing Unit)) 201, a memory 202, an input device 203, an output device 204, an auxiliary information storage device 205, a medium drive device 206 where a portable recording medium 209 can be inserted, and a communication device 207. These components are connected to one another by a bus 208. The configuration shown in FIG. 2 is an example of the computer capable of realizing the above-mentioned device 101, 102, or 104, and such a computer is not limited to this configuration.

The memory 202 is a semiconductor memory such as a read only memory (ROM), a random access memory (RAM), or a flash memory; and stores programs and data usable for processes.

The processor 201 executes programs corresponding to the processes of individual flow charts to be described below, for example, using the memory 202.

The input device 203 is, for example, a keyboard, a pointing device, etc., and can be used to receive instructions or information from the operator or the user. The output device 204 is, for example, a display device, a printer, a speaker, etc., and can be used to inquire of the operator or the user or to output process results.

The auxiliary information storage device 205 is, for example, an SSD (Solid State Drive), a hard disk storage device, a magnetic disk storage device, an optical disk device, a magneto-optical disk device, a tape device, or a semiconductor storage device. Each of the above-mentioned devices 101, 102, and 104 can store programs for performing the processes of individual flow charts (to be described below) and data, usable in the corresponding device, in the auxiliary information storage device 205, in advance, and load them into the memory 202 in order to use them.

The medium drive device 206 drives the portable recording medium 209, and accesses the recorded contents. The portable recording medium 209 is a memory device, a flexible disk, an optical disk, a magneto-optical disk, etc. The portable recording medium 209 may be a compact disk read only memory (CD-ROM), a digital versatile disk (DVD), a universal serial bus (USB) memory; an SD memory card, etc. The operator or the user can store the above-mentioned programs and data in the portable recording medium 209 in advance, and load them into the memory 202 in order to use them.

As described above, computer-readable recording media for storing the above-mentioned programs and data are physical (non-transitory) recording media such as the memory 202, the auxiliary information storage device 205, and the portable recording medium 209.

The communication device 207 is connected to the network 105 such as a local area network (LAN) or a wide area network (WAN), and includes a communication interface for performing data conversion according to communication. The above-mentioned device 101, 102, or 104 can receive the above-mentioned programs or data from an external device connected to the network 105 through the communication device 207, and load them in the memory 202 in order to use them. Also, in the case where the communication device 207 is built in the terminal 102 of FIG. 1, it has not only the above-mentioned functions but also an interface function for connection with the musical instrument 103 of FIG. 1 through the interface such as USB-MIDI.

By the way, each of the above-mentioned devices 101, 102, and 104 does not need to include all the components of FIG. 2, and depending on purposes or conditions, some of the components may be omitted. For example, in the case where it is unnecessary to receive instructions or information from the operator or the user, the input device 203 may be omitted. In the case where the portable recording medium 209 is not used, the medium drive device 206 may be omitted.

A first embodiment of the operation of the information providing system of FIG. 1 and FIG. 2 will be described with reference to the sequence diagram of FIG. 3.

If the user (hereinafter, the user who plays the musical instrument 103 is referred to as the first user) connects the musical instrument 103 and the terminal 102, for example, by USB-MIDI, and plays a piece of music (a first piece of music) on the musical instrument 103, the processor 201 of the terminal 102 acquires performance-related information through the communication device 207 of the terminal 102, and transmits the performance-related information as log information 301 from the communication device 207 of the terminal 102 to the recommendation server 101 through the network 105 (S301 of the sequence of FIG. 3).

Figure 3:
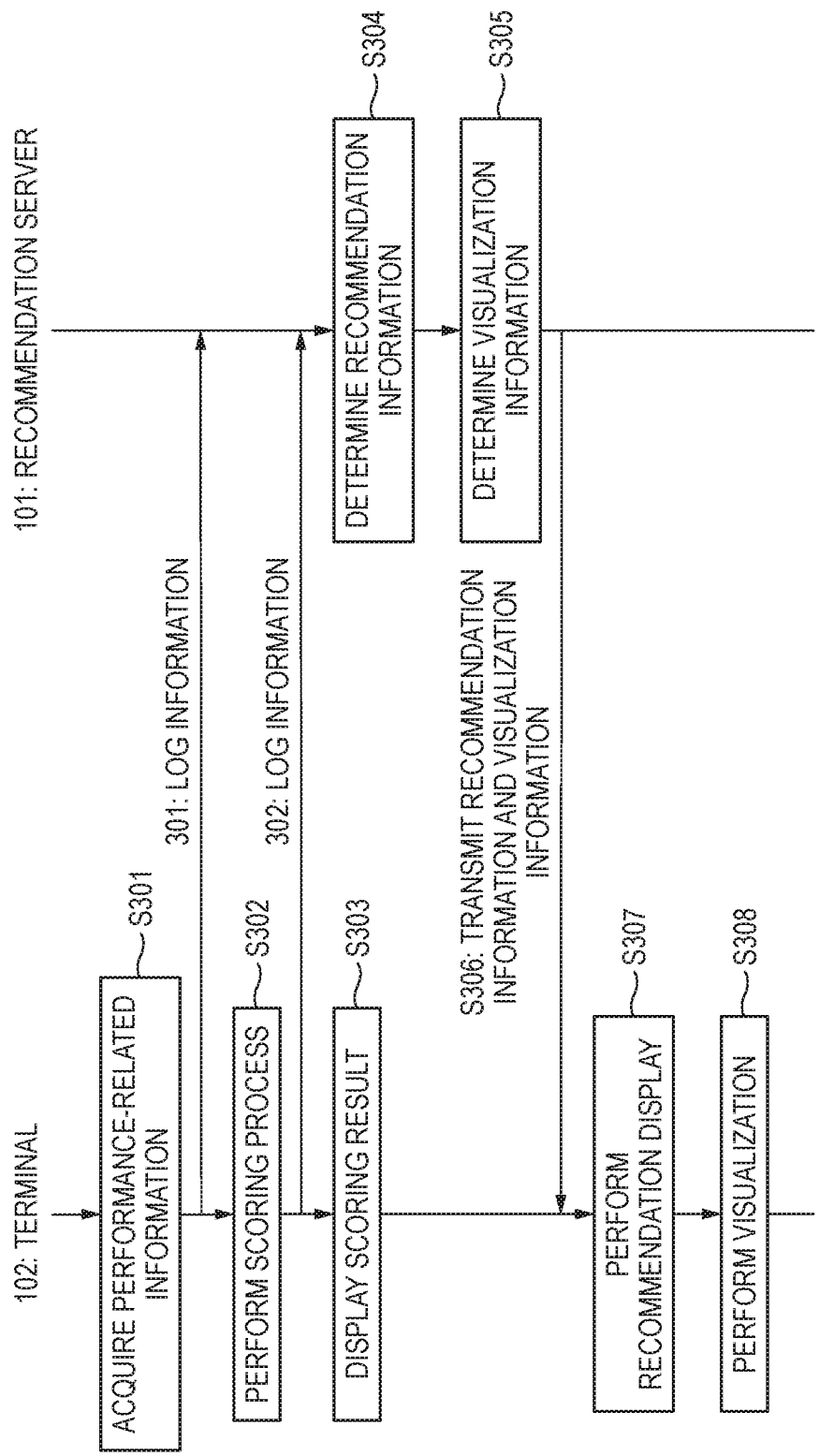
FIG. 3 is a sequence diagram illustrating an operation example of the information providing system according to a first embodiment.

Also, if the first user plays the musical instrument with the scoring function enabled, the processor 201 of the terminal 102 receives data on the piece of music which the first user plays on the musical instrument, from the music data server 104 through the network 105 and the communication device 207 of the terminal 102, thereby performing the process of scoring the user's performance on the musical instrument 103 with respect to the above-mentioned performance-related information, and transmits the scoring information on the interim result, final result, and so on of the scoring, as log information 302, from the communication device 207 of the terminal 102 to the recommendation server 101 through the network 105 (S302 of the sequence of FIG. 3).

Also, the processor 201 of the terminal 102 displays the scoring result on the output device 204 (for example, a liquid crystal display of a smart device which is the terminal 102) (S303 of the sequence of FIG. 3).

In the recommendation server 101, the processor 201 of the recommendation server 101 receives the performance-related information and the scoring information transmitted as the log information 301 and 302 from the terminal 102 through the network 105, through the communication device 207 of the recommendation server 101. Then, the processor 201 transmits information determined based on the performance-related information (on operations, music use, function use, etc.) and the scoring information (the score), and a plurality of pieces of performance-related information stored in the memory 202 according to performances of a plurality of users other than the first user who plays the musical instrument 103, including a second user, from the communication device 207 of the recommendation server 101 in order to provide the determined information to the first user (S304 of the sequence of FIG. 3).

Here, the processor 201 of the recommendation server 101 classifies the first user into any one type of a plurality of types including at least a carefree type, a stoic type, and a frustrated type, based on a plurality of pieces of performance-related information of the first user, and determines information to be provided to the first user, based on performance-related information of the second user of the same type as the classified type.

Also, if receiving the scoring information as the log information 302 from the terminal 102, the processor 201 of the recommendation server 101 determines the plurality of types based on at least the scoring information on performances of the individual users and their training periods.

Further, the information to be provided to the first user may include at least one of information on a second piece of music which has never been played by the first user but has been played by another user and information on functions which another user used when playing the first piece of music.

Examples of more specific information to be provided to the first user may include the followings.

The next piece of music to be challenged (depending on level)
A function for supporting training
An introduction of a piece of music which a user who is at the same level is playing well
The score, judgment, and ranking of each section of the scored piece of music
Technical advice Subsequently, the processor 201 of the recommendation server 101 generates information for visualizing the recommendation information determined in S304 of the sequence and the result obtained from the type of the user by analysis (S305 of the sequence of FIG. 3).

Then, the processor 201 of the recommendation server 101 transmits information such as the recommendation information determined in S303 of the sequence and the visualization information generated in S305 of the sequence, as a reply, from the communication device 207 of the recommendation server 101 to the terminal 102 through the network 105 (S306 of the sequence of FIG. 3).

The terminal 102 performs recommendation display and visualization of the analysis result on the output device 204 (such as a liquid crystal display) of the terminal 102 based on the visualization information of the information transmitted from the recommendation server 101 through the network 105 and the communication device 207 of the terminal 102 by the following display methods, together with the scoring result display of S303 of the sequence (S307 and S308 of the sequence of FIG. 3).

Text display of the recommendation information
Time-series scoring information (the scores and advice comments of individual sections also are described)
A growth curve (with comparison to other users)
A radar chart (representing the characteristics of the first user)

Although the related art uses a musical instrument and a smart phone to provide the function to the user, by the recommendation server 101, it becomes possible to provide wider and optimal recommendation information. Since it is boring to play the musical instrument alone, such information motivates the user to continue to play. The user can realize that the user is not the only one who is training alone and other people also are doing similar things. It becomes possible to provide helpful information obtained not only during training of the user but also during training of other people, as recommendation information. It is possible for other people to notice something (a piece of music or a function) which the user does not notice, and when the user learns how to play a favorite piece of music, appropriate advice or recommendation can be made from data (big data) on the learning processes of similar other users, and the user who is learning can take advice from actual success cases of other people. Since such advice is not derived from mechanism logic, it is very persuasive, and the user can be conscious of other people. Therefore, it is possible to expect the effect of continuing improvement of motivation to continue training.

Now, a second embodiment representing a more specific operation example of the information providing system of FIG. 1 and FIG. 2 will be described with reference to the flow charts of FIG. 4 to FIG. 6 and the explanatory diagrams of FIG. 7A to 13.

Figure 4:
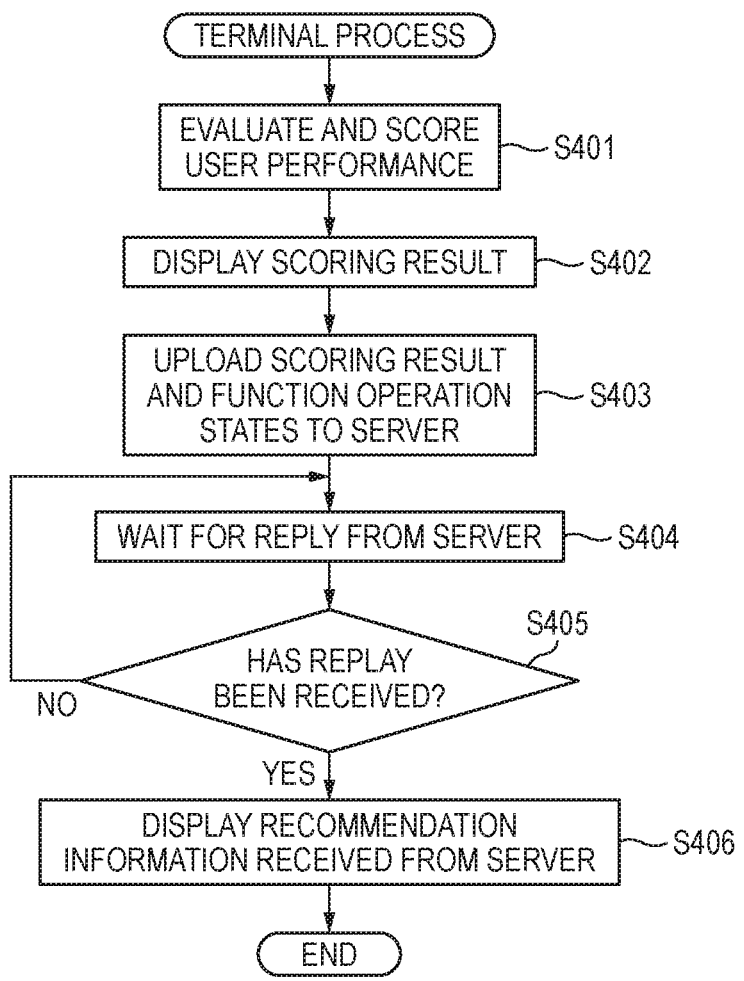
FIG. 4 is a flow chart illustrating a terminal process example of the information providing system according to a second embodiment.

FIG. 4 is a flow chart illustrating a terminal process example which the processor 201 of the terminal 102 of the information providing system of FIG. 1 performs in the second embodiment. This flow chart represents a process in which the processor 201 executes a control program stored in the memory 202 in the terminal 102.

Figure 5:
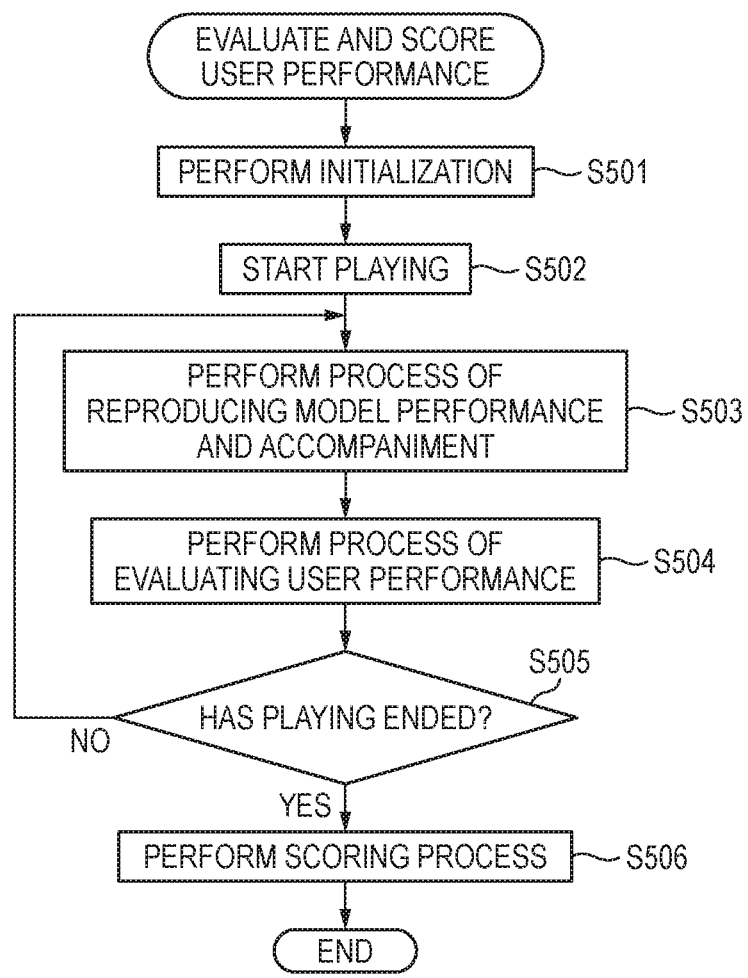
FIG. 5 is a flow chart illustrating an example of a process of evaluating and scoring a user performance according to the second embodiment.

FIG. 5 is a flow chart illustrating a more detailed operation example of STEP S401 of the terminal process of FIG. 4.

Figure 6:
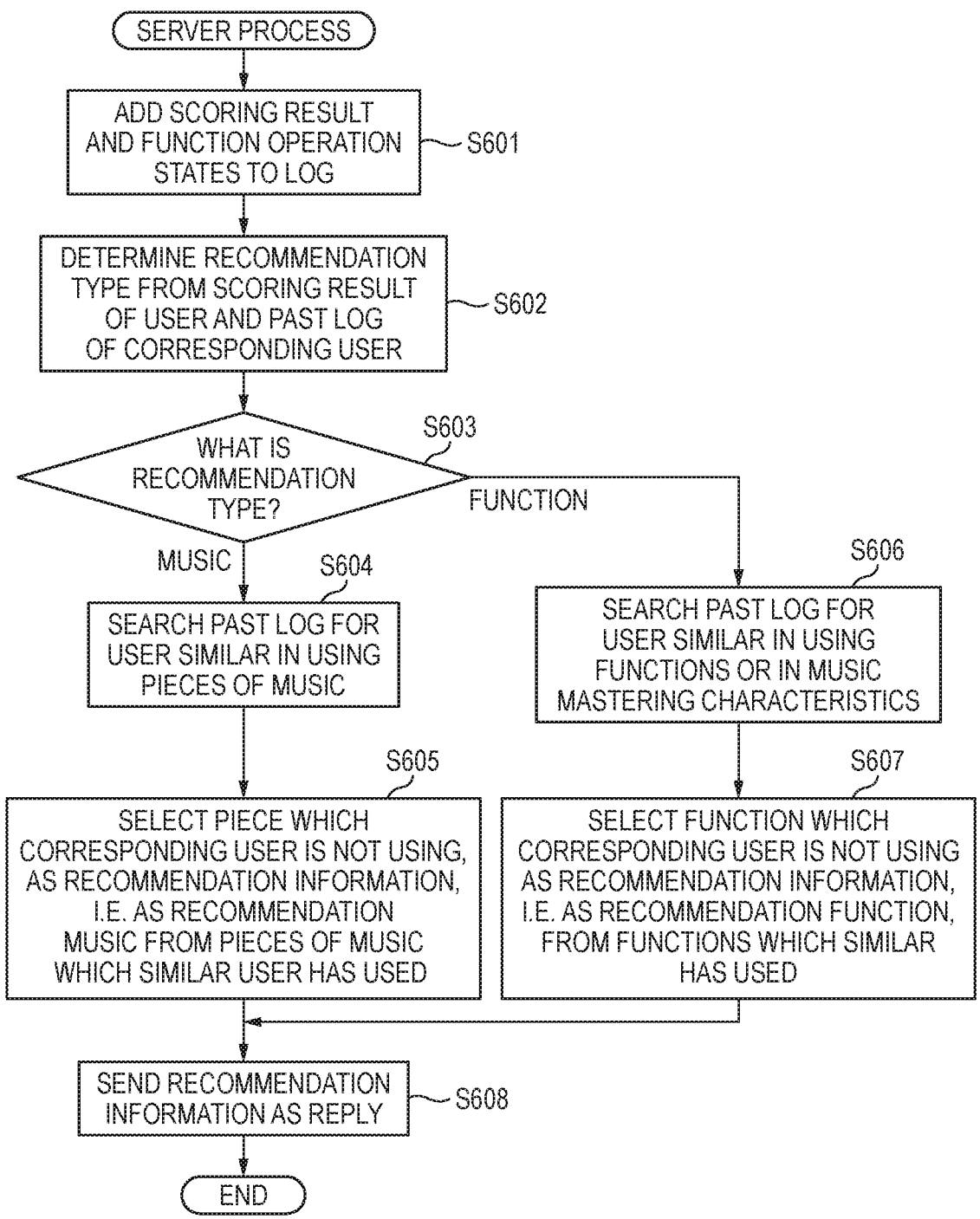
FIG. 6 is a flow chart illustrating a server process example of the information providing system according to the second embodiment.

FIG. 6 is a flow chart illustrating a server process example which the processor 201 of the recommendation server 101 of the information providing system of FIG. 1 performs in the second embodiment. This flow chart represents a process in which the processor 201 executes a control program, stored in the memory 202, in the recommendation server 101.

First, in the flow chart of FIG. 4, similarly to the operations of S301 and S302 of the sequence of FIG. 3 of the first embodiment described above, the processor 201 of the terminal 102 acquires performance-related information from the musical instrument 103, and receives data on the piece of music which the user (the first user) plays on the musical instrument, from the music data server 104 through the network 105 and the communication device 207 of the terminal 102, thereby performing a process of scoring the user's performance of the musical instrument 103 with respect to the performance-related information (STEP S401 of FIG. 4).

Details of this process will be described using FIG. 5. First, the processor 201 of the terminal 102 performs initialization of an area on the memory 202 of the terminal 102 for reproducing a model performance and accompaniment, various variables, etc. (STEP S501 of FIG. 5).

Next, the processor 201 of the terminal 102 starts transmitting an automatic performance data item for the model performance and the accompaniment, acquired from the music data server 104, from the communication device 207 of the terminal 102 to the musical instrument 103 through USB-MIDI, and starts playing (STEP S502 of FIG. 5).

Thereafter, the processor 201 of the terminal 102 repeatedly performs the following sequential processes of STEP S503 to STEP S505 during playing. In this sequential processes, the processor 201 of the terminal 102 performs a process of reproducing the model performance and the accompaniment first (STEP S503 of FIG. 5). Specifically, in the process of reproducing the model performance and the accompaniment, the processor 201 of the terminal 102 outputs note numbers to the sound source of the musical instrument 103 at the timings when it is required to produce or muffle sound with time while sequentially reading the automatic performance data item for reproducing the model performance and the accompaniment acquired from the music data server 104 into the memory 202 of the terminal 102. In response to a user's operation, the processor performs the reproducing process according to the settings such as tempo on/off, metronome on/off, presence/absence of model performance guide.

Next, the processor 201 of the terminal 102 performs a process of evaluating the user performance, based on the performance-related information transmitted from the musical instrument 103 (STEP S504 of FIG. 5). Specifically, the processor 201 of the terminal 102 counts up the number of correct answers, the number of mistouches, etc., based on whether or not there is a model performance near the timing of a user performance, note number (pitch) comparison, timing deviation, etc. Depending on the degree of deviation, the number of correct answers may be divided into the number of correct answers and the number of almost correct answers. Also, in the case of counting "correct answers" and "almost correct answers" in each of the first half and the second half of the piece of music based on the elapsed time, in user type (the carefree type, the stoic type, the frustrated type, etc.) determination (to be described below) which is performed in the recommendation server 101, it becomes possible to perform more detailed user type determination, based on the difference between "The performance was not good at all in the second half but was OK in the first half" and "The performance was not good overall". Also, the processor 201 of the terminal 102 counts the number of notes of the model performance for normalization to be performed in STEP S506 (to be described below).

Next, the processor 201 of the terminal 102 determines whether the reproduction of the model performance and the accompaniment has ended and the playing has ended (STEP S505 of FIG. 5).

If the playing has not ended (the determination result of STEP S505 is "NO") the processor 201 of the terminal 102 repeatedly performs the sequential processes of STEPS S503 to S505.

If the playing has ended (the determination result of STEP S505 is "YES"), the processor 201 of the terminal 102 performs a scoring process (STEP S506 of FIG. 5). In this process, the processor 201 of the terminal 102 performs score deduction according to timing deviation and mistouches, based on the ratio of the number of correct answers evaluated in STEP S505 to the number of notes of the model performance counted as described above.

Thereafter, the processor 201 of the terminal 102 finishes the evaluating process of STEP S401 of FIG. 4 shown in the flow chart of FIG. 5.

Referring to FIG. 4 again, the following description will be made. The processor 201 of the terminal 102 displays the scoring result based on the evaluating process of STEP S401 on the output device 204 (for example, a liquid crystal display of a smart device which is the terminal 102), in the same way as that in the case of STEP S303 of the sequence of FIG. 3 according to the first embodiment (STEP S402 of FIG. 4).

Subsequently, the processor 201 of the terminal 102 uploads the scoring result of STEP S402 and the operation state of each function included in the information received as the performance-related information from the musical instrument 103, from the communication device 207 of the terminal 102 to the recommendation server 101 through the network 105 (STEP S403 of FIG. 4).

Thereafter, the processor 201 of the terminal 102 stands by (the determination results of STEPS S404 and S405 of FIG. 4 repeatedly become "NO") until a reply is received from the recommendation server 101 through the network 105 and the communication device 207 of the terminal 102.

The server process of FIG. 6 in which the recommendation server 101 responds to the above-mentioned upload will be described. The processor 201 of the recommendation server 101 first adds the scoring result and the function operation states received from the terminal 102 through the network 105 and the communication device 207 of the recommendation server 101, to a score log and an operation log stored in the memory 202 or the auxiliary information storage device 205 of the recommendation server 101 (STEP S601 of FIG. 6).

FIGS. 7A and 7B are diagrams illustrating examples of a score log and an operation log which can be specifically generated in STEP S601 of FIG. 6. In a score log illustrated in FIG. 7A, user IDs identifying users, music IDs identifying scored pieces of music, scoring dates, and scores representing scoring results which are included scoring information which is received from the terminals 102 are logged. In an operation log illustrated in FIG. 7B, user IDs identifying users, function IDs identifying functions, function operating dates, and values representing function operation amounts which are included in function operation states which are received from the terminals 102 are logged.

Next, the processor 201 of the recommendation server 101 sets a recommendation type from the scoring result included in the scoring information of the user received from the terminal 102 and the past score log of the corresponding user (STEP S602 of FIG. 6). Specifically, if it is determined from the past score log of the user that the current scoring result is already close to the highest score or that the score of the scoring result is low and the scoring result has not improved, the recommendation type is set to "Music"; otherwise, the recommendation type is set to "Function".

Next, the processor 201 of the recommendation server 101 determines the recommendation type set in STEP S602 (STEP S603 of FIG. 6).

In the case where it is determined in STEP S603 that the recommendation type is "Music", the processor 201 of the recommendation server 101 searches the past score log for another user similar in using pieces of music as a second user while analyzing music use tendencies (STEP S604 of FIG. 6).

FIG. 8 is a diagram depicting an example of a music database stored in the memory 202 or the auxiliary information storage device 205 of the recommendation server 101, as basic data for analyzing music use tendencies. The music database retains a plurality of music data records having, as items representing attributes of pieces of music, music IDs for identifying the pieces of music, difficulty levels which are indexes indicating the difficulty in playing, the genres of the pieces of music, and the titles of the pieces of music.

In STEP S604 of FIG. 6, from the latest score log of FIG. 7A corresponding to a predetermined period, and the music database of FIG. 8, with respect to pieces of music recorded for each user ID on the score log, the processor 201 of the recommendation server 101 generates music use tendency data shown in FIG. 9A and including the average of the difficulty levels (difficulty information on the pieces of music which the corresponding user has used for training), and the number of times of use of etudes, the number of times of use of pops, and the number of times of use of piano music (genre information on the pieces of music which the corresponding user has used for training), and the number of times of use of songs, acquired from the music database of FIG. 8, on the memory 202 of the recommendation server 101. Further, in STEP S604 of FIG. 6, the processor 201 of the recommendation server 101 selects user sets, each of which consists of two arbitrary users, from the plurality of users registered in the score log, and calculates the square of the difference between the item values of each of the above-mentioned items with respect to each user set, and adds up the calculation results of the individual items with respect to each user set, and calculates the square root of the addition result, thereby calculating the distances with respect to the user sets. In this way, the processor generates table data representing the distances of the individual user sets on the memory 202 of the recommendation server 101, as shown in FIG. 9A as the inter-user music use tendency distance. Furthermore, in STEP S604 of FIG. 6, the processor 201 of the recommendation server 101 selects a user set including the user ID corresponding to the user notified from the terminal 102 and having the smallest distance, from the table data of the inter-user music use tendency distance of FIG. 9A, and searches for the other user constituting the selected user set together with the corresponding user, as another user similar in the music use tendencies, i.e. as a second user.

In other words, the server apparatus determines another user similar to the first user in the music use tendencies, as a second user, based on at least one of information on the difficulty levels of the pieces of music which have been used for training and information on the genres of the pieces of music which have been used for training.

In the music use tendency data shown in FIG. 9A as the music use tendency data, the number of times of each of the items other than the difficulty level item is stored; however, the ratio of each item may be stored.

Next, the processor 201 of the recommendation server 101 selects a piece of music which the corresponding user is not using, as recommendation information (recommendation music), from the pieces of music which the similar user found in STEP S604 has used, by referring to the score log of FIG. 7A (STEP S605 of FIG. 6).

In the case where it is determined in STEP S603 that the recommendation type is "Function", the processor 201 of the recommendation server 101 searches the past operation log for another user similar in using the functions as a second user while analyzing function use tendencies, or searches the past operation log for another user similar in music mastering characteristics as a second user while analyzing the music mastering characteristics (periods required to master a certain piece of music, and the tendencies of score change or score distribution) (STEP S606 of FIG. 6).

First, the process of STEP S606 which is performed in the case where the function use tendencies are analyzed will be described. In STEP S606 of FIG. 6, from the latest operation log of FIG. 7B corresponding to a predetermined period, the processor 201 of the recommendation server 101 generates function use tendency data shown in FIG. 9B as the function use tendency data and including the numbers of times of use of individual functions recorded for individual user IDs on the operation log, on the memory 202 of the recommendation server 101. Further, in STEP S606 of FIG. 6, while selecting user sets each of which consists of two arbitrary users from the plurality of users registered in the operation log, the processor 201 of the recommendation server 101 calculates the square of the difference between two item values of each of the above-mentioned items with respect to each user set, and adds up the calculation results of the individual items with respect to each user set, and calculates the square root of the addition result, thereby calculating the distances with respect to the user sets. In this way, the processor generates table data representing the distances of the individual user sets on the memory 202 of the recommendation server 101, as shown in FIG. 9B as the inter-user function use tendency distance. Furthermore, in STEP S604 of FIG. 6, the processor 201 of the recommendation server 101 selects a user set including the user ID corresponding to the user notified from the terminal 102 and having the smallest distance, from the table data of the inter-user function use tendency distance of FIG. 9B, and searches for the other user constituting the selected user set together with the corresponding user, as another user similar in the function use tendencies, i.e. as a second user.

In the function use tendency data shown in FIG. 9B as the function use tendency data, the number of times of each of the items is stored; however, the ratio of each item may be stored.

Figure 10A:
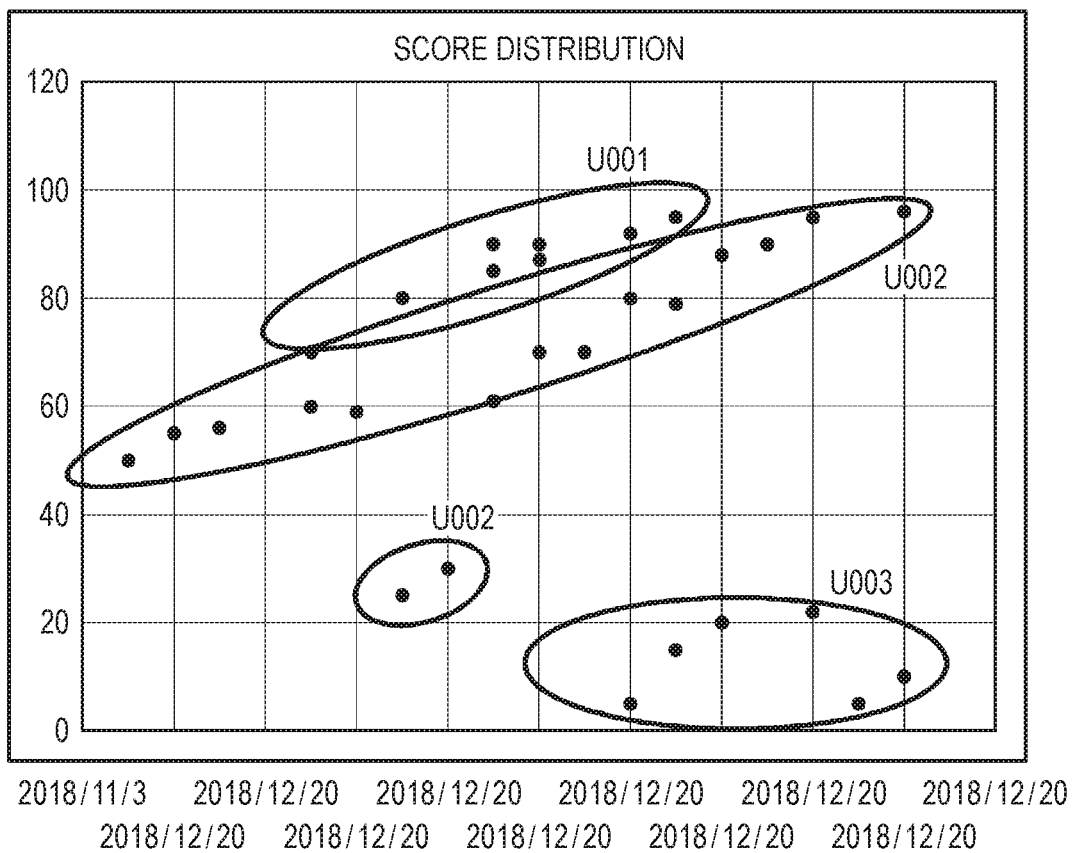
FIG. 10A is a diagram depicting examples of score distributions according to the second embodiment.
Figure 10B:
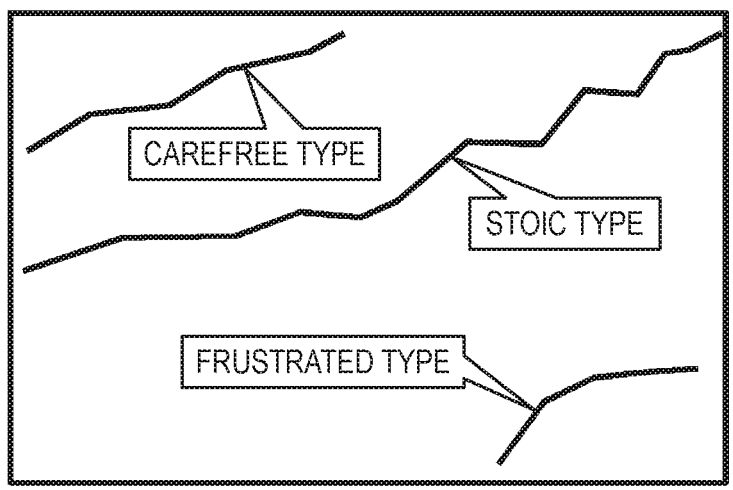
FIG. 10B is a diagram depicting examples of user types of individual users according to the second embodiment.
Figure 12:
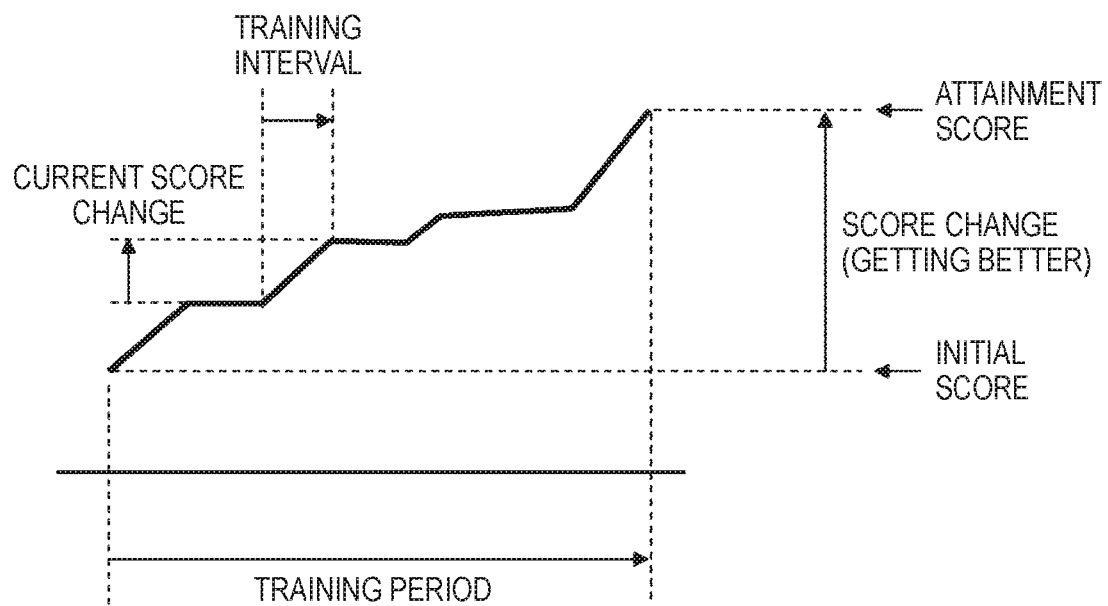
FIG. 12 is an explanatory diagram of music mastering characteristics according to the second embodiment.

Now, the process of STEP S606 which is performed in the case where music mastering characteristics are analyzed will be described. As basic data for analyzing music mastering characteristics, score distributions of individual users are effective. For this reason, the processor 201 of the recommendation server 101 can calculate the score distributions of the individual users (U001, U002, and U003) as shown in FIG. 10A, by grouping the scores of the score log of FIG. 7A depending on the users by cluster analysis. This score distribution chart represents such user types as shown in FIG. 10B, with the time-series score tendencies of the individual users as indexes. As shown in FIGS. 10A and 10B, the user with the user ID "U002" has consistently improved the score from a low-score state and has got better at playing for a comparatively long time (for example, one month). This type can be called a stoic type. Also, the user with the user ID "U003" trained only for a short time, and gave up at a low-score state. This type can be called a frustrated type. Further, the user with the user ID "U001" has eventually obtained high scores and has got better at playing within a comparatively short time. This type can be called as a carefree type. In STEP S606, the processor 201 of the recommendation server 101 selects, for example, another user of a cluster having the center closest to the center of the cluster of the corresponding user in the data of the score distribution chart calculated as shown in FIG. 10A, as a user similar in the music mastering characteristics.

In other words, the server apparatus determines another user similar to the first user in the music mastering characteristics which can be determined from the distributions of scores each of which is calculated whenever each user plays the musical instrument, as a second user, based on the types of the individual users which are determined from the distributions of scores of the users.

Now, another specific process of STEP S606 which is performed in the case of searching for another user similar in music mastering characteristics will be described. In STEP S606, the processor 201 of the recommendation server 101 sorts the data of the score log of FIG. 7A by user ID, and calculates initial scores, attainment scores, training intervals, score changes, current score changes, and training periods, which are the values of indexes shown in FIG. 12, thereby generating table data shown in FIG. 11 on the memory 202 of the recommendation server 101.

Further, in STEP S606, the processor 201 of the recommendation server 101 calculates the average of the values of each of the indexes with respect to each user ID, from the above-mentioned table data, thereby generating music mastering characteristic parameter table data of the music mastering characteristic parameter table of FIG. 13 on the memory 202 of the recommendation server 101. Furthermore, in STEP S606, the processor 201 of the recommendation server 101 selects user sets, each of which consists of two arbitrary users, from the plurality of users registered in the score log, and calculates the square of the difference between two values of each of the indexes with respect to each user set, and adds up all of the calculation results of the indexes with respect to each user set, and calculates the square root of the addition result, thereby calculating the distances of the individual user sets. In this way, the processor generates table data representing the distances of the user sets on the memory 202 of the recommendation server 101, as shown in FIG. 13 as the inter-user music mastering characteristic distance. Moreover, in STEP S606, the processor 201 of the recommendation server 101 selects a user set including the user ID corresponding to the user notified from the terminal 102 and having the smallest distance, from the table data of the inter-user music mastering characteristic distance of FIG. 13, and searches for the other user constituting the selected user set together with the corresponding user, as a user similar in the music use tendencies).

Like this, by comparing information on two users, i.e. the corresponding user for who recommendation information will be transmitted and one arbitrary user of the plurality of other users, it is possible to find one arbitrary user most similar to the corresponding user in characteristics (the music use tendencies, or the function use tendencies, or the music mastering characteristics).

After the process of STEP S606 of FIG. 6 described above, the processor 201 of the recommendation server 101 selects a function which the corresponding user is not using, of the functions which the similar user found in STEP S606 has used, as recommendation information, i.e. as a recommendation function (STEP S607 of FIG. 6).

After STEP S605 or STEP S607, the processor 201 of the recommendation server 101 sends the recommendation music or the recommendation function selected as the recommendation information, as a reply, from the communication device 207 of the recommendation server 101 to the terminal 102 through the network 105 (STEP S608 of FIG. 6). Thereafter, the processor 201 of the recommendation server 101 ends the server process which is a process of sending a reply to the terminal 102.

Referring to the terminal process of FIG. 4 again, the following description will be made. If the above-mentioned reply is received from the recommendation server 101, the determination result of STEP S405 becomes "YES". As a result, the processor 201 of the terminal 102 displays the above-mentioned recommendation information received from the recommendation server 101 through the network 105 and the communication device 207 of the terminal 102, on the liquid crystal display or the like of the output device 204 of the terminal 102, whereby recommendation display is performed.

In the above-described second embodiment, it can be seen by comparing the music mastering characteristic parameter table of FIG. 13 with the relation between score distributions and user characteristics of FIG. 10B that the music mastering characteristic parameter table which is calculated represents user types such as the carefree type, the stoic type, and the frustrated type well as shown in FIG. 10A to FIG. 13, In the second embodiment, as described above, the recommendation information corresponding to the corresponding user is determined based on the performance-related information of another user similar in the user types. Therefore, it becomes possible to provide more appropriate recommendation information.

In the above-described second embodiment, in STEP S606 of FIG. 6, the processor 201 of the recommendation server 101 may randomly determine either the function use tendency analysis method or the music mastering characteristic analysis method, and may change the analysis method every time.

As described in the second embodiment, by analyzing tendencies such as the music use tendencies, the function use tendencies, the music mastering characteristics, etc., when offering recommendation music, or offering a recommendation function, or advising on a training method, an appropriate and convincing recommendation for the user is obtained, such that the user can be conscious of other people. Therefore, the effect of maintaining the training motivation is obtained.

In the case where a person of the frustrated type does not want to receive recommendations based on performance-related information of other people of the frustrated type, for example, the person of the frustrated type may receive recommendations based on performance-related information of other people of the stoic type by a user's switch operation.

Further, as described in STEP S504 of FIG. 5, if counting the number of "correct answers" and the number of "almost correct answers" in each of the first half and the second half of a piece of music based on the elapsed time, in user type (the carefree type, the stoic type, the frustrated type, etc.) determination which is performed in the recommendation server 101, it becomes possible to perform more detailed user type determination, based on the difference between "The performance was not good at all in the second half but was OK in the first half" and "The performance was not good overall", and it becomes possible to provide more appropriate recommendation information based on those determinations.

As another modification other than the first embodiment and the second embodiment, tempo information may be added during a process of scoring a piece of music such that it is possible to see what the tempo in which the user was training the piece of music is, and the tempo information may also be recorded in the score log in order to recommend the user to train in a lower tempo in the case where the user is not proficient. Further, with respect to a degree of learning of a piece of music (a score) of a user, an example of a tempo value appropriate for training may be recommended with reference to the log of another user similar to the user in level, such that the user can see what the tempo in which the user should train for getting better is.

As another modification, information on use of the "Metronome" function, an "REC" function, and the "A-B Repeating" function which are functions supposed to be used during training may be added such that it is possible to recommend a function having a high use frequency as a function which may be effective for training of the using playing a specific piece of music. For example, in the case where the function which a certain user used most frequently until the user got a high score with respect to a piece of music was the "Metronome" function, it is possible to recommend the "Metronome" function as a recommendation function for training of the user playing the same piece of music.

In other words, the server apparatus determines another user similar to the first user in function use tendencies shown during playing, as a second user, based on at least one of the items "Number of Times of Metronome Use, "Number of Times of Tempo Change", and "Number of Times of Pedal Use" which have been counted during training.

As another modification, favorite music genres of a user may be narrowed down based on the highest scores and the numbers of times of use in order to recommend a piece of music having a difficulty level close to the average of the difficulty levels of pieces of music which the user has used in the corresponding genres.

As another modification, a favorite tone may be estimated from the numbers of times of use such that it is possible to recommend a piece of music based on the favorite tone.

The disclosed embodiments and the advantages thereof have been described in detail, and those skilled in the art can make various modifications, additions, and omissions without departing from the scope of the present disclosure disclosed in claims. In other words, even if all of these processes are performed by a plurality of processors, not by one processor, or even if they are performed in a distributed way by a plurality of devices, these embodiments fall within the scope of patent rights of this application.

In addition, the present disclosure is not limited to the above-described embodiments, and can be modified in various forms at the time of carrying out the disclosure, without departing from the gist of the present disclosure. Also, combinations of the functions which are performed in the above-described embodiments may be made as properly as possible and be implemented. The embodiments include inventions of various stages, and thus various inventions may be extracted by appropriate combinations of a plurality of disclosed constituent elements. For example, configurations which are obtained by eliminating some constituent elements eliminated from among all the constituent elements shown in the embodiments may be extracted as inventions, as long as the effect is obtained even if those constituent elements are eliminated.

The invention claimed is:

1. A recommend apparatus comprising:
a communication device; and
at least one processor,
wherein the at least one processor is configured to:
receive performance information generated based on a performance of a first user, through the communication device;
determine a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play;
determine recommendation information to be provided to the first user, based on performance information of the determined second user; and
send the determined recommendation information from the communication device.

2. The recommend apparatus according to claim 1, wherein
the at least one processor is configured to determine the second user similar to the first user in the music use tendencies, based on at least one of difficulty information on pieces of music which have been used for training and genre information on the pieces of music which have been used for training.

3. The recommend apparatus according to claim 1, wherein
the at least one processor is configured to determine the second user similar to the first user in the function use tendencies, based on at least one of information on the numbers of times of metronome use, information on the numbers of times of tempo change, and information on the numbers of times of pedal use.

4. The recommend apparatus according to claim 1, wherein
the at least one processor is configured to determine the second user similar to the first user in the music mastering characteristics, based on types of users which are determined from distributions of scores of individual users.

5. The recommend apparatus according to claim 1, wherein
the recommendation information includes at least one of information on a piece of music which the first user has not played but the second user has played and information on a function which the second user used during playing.

6. An information providing system having a recommend apparatus and a terminal device, wherein
the recommend apparatus includes:
a communication device; and
at least one processor, and
the at least one processor is configured to:
receive performance information generated based on a performance of a first user, through the communication device;
determine a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play;
determine recommendation information to be provided to the first user, based on performance information of the determined second user; and
send the determined recommendation information from the communication device, and
the terminal device is configured to:
send performance-related information to the recommend apparatus;
receive the recommendation information sent from the communication device; and
display the received recommendation information.

7. The information providing system according to claim 6, wherein the at least one processor of the recommend apparatus is configured to determine the second user similar to the first user in the music use tendencies, based on at least one of difficulty information on pieces of music which have been used for training and genre information on the pieces of music which have been used for training.

8. The information providing system according to claim 6, wherein
the at least one processor of the recommend apparatus is configured to determine the second user similar to the first user in the function use tendencies, based on at least one of information on the numbers of times of metronome use, information on the numbers of times of tempo change, and information on the numbers of times of pedal use.

9. The information providing system according to claim 6, wherein
the at least one processor of the recommend apparatus is configured to determine the second user similar to the first user in the music mastering characteristics, based on types of users which are determined from distributions of scores of individual users.

10. The information providing system according to claim 6, wherein
the recommendation information includes at least one of information on a piece of music which the first user has not played but the second user has played and information on a function which the second user used during playing.

11. A method performed by a recommend apparatus, comprising:
receiving performance information generated based on a performance of a first user, through a communication device;
determining a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play;
determining recommendation information to be provided to the first user, based on performance information of the determined second user; and
sending the determined recommendation information from the communication device.

12. The method according to claim 11, wherein
the determining comprises determining the second user similar to the first user in the music use tendencies, based on at least one of difficulty information on pieces of music which have been used for training and genre information on the pieces of music which have been used for training.

13. The method according to claim 11, wherein
the determining comprises determining the second user similar to the first user in the function use tendencies, based on at least one of information on the numbers of times of metronome use, information on the numbers of times of tempo change, and information on the numbers of times of pedal use.

14. The method according to claim 11, wherein
the determining comprises determining the second user similar to the first user in the music mastering characteristics, based on types of users which are determined from distributions of scores of individual users.

15. The method according to claim 11, wherein
the recommendation information includes at least one of information on a piece of music which the first user has not played but the second user has played and information on a function which the second user used during playing.

16. A non-transitory computer-readable storage medium storing a program for causing a recommend apparatus to execute a process, the process comprising:
receiving performance information generated based on a performance of a first user, through a communication device;
determining a second user from a plurality of other users based on the received performance information of the first user, the second user being at least one of other users similar to the first user in music use tendencies, other users similar to the first user in function use tendencies shown during playing, and other users similar to the first user in music mastering characteristics determined from distributions of scores each of which is calculated for each play;
determining recommendation information to be provided to the first user, based on performance information of the determined second user; and
sending the determined recommendation information from the communication device.

* * * * *